US00RE38467E

(19) United States
(12) Reissued Patent
Lincoln

(10) Patent Number: US RE38,467 E
(45) Date of Reissued Patent: Mar. 23, 2004

(54) TRANSPARENT AQUATIC BOARD

(76) Inventor: Bruce C. Lincoln, 1308 E. Desert Broom Way, Phoenix, AZ (US) 85048

(21) Appl. No.: 29/102,729

(22) Filed: Mar. 30, 1999

Related U.S. Patent Documents

Reissue of:
(64) Patent No.: Des. 378,692
Issued: Apr. 1, 1997
Appl. No.: 29/050,713
Filed: Feb. 23, 1996

(51) LOC (6) Cl. ..... 21-02
(52) U.S. Cl. ..... D21/769; D21/803
(58) Field of Search ..... D21/760, 769, D21/770, 771, 801, 803; 441/135, 74, 79

(56) References Cited

U.S. PATENT DOCUMENTS

| | | | | |
|---|---|---|---|---|
| D221,262 | S | * | 7/1971 | Marshall |
| D265,898 | S | * | 8/1982 | Cerkovnik et al. |
| RE31,167 | E | | 3/1983 | Schweitzer et al. |
| D269,668 | S | * | 7/1983 | Schweitzer |
| 4,691,658 | A | | 9/1987 | New et al. |
| 4,715,837 | A | * | 12/1987 | Floyd |
| 4,798,549 | A | * | 1/1989 | Hirsch |
| 4,844,595 | A | | 7/1989 | Nealy |
| 4,850,914 | A | | 7/1989 | Cox |
| 4,925,417 | A | | 5/1990 | Warren |

* cited by examiner

*Primary Examiner*—Kay H. Chin
(74) *Attorney, Agent, or Firm*—Gallagher & Kennedy, P.A.; Thomas D. MacBlain

(57) CLAIM

The ornamental design for a transparent aquatic board, as shown and described.

DESCRIPTION

*FIG. 8 is a perspective view of a further emdodiment of a transparent aquatic board showing my new design;*

*FIG. 9 is a top view of the board of FIG. 8;*

*FIG. 10 is a bottom view of the board of FIG. 8;*

*FIG. 11 is a side elevational view of the transparent aquatic board of FIG. 8 showing my new design;*

*FIG. 12 is a front view of the board of FIG. 8;*

*FIG. 13 is a rear view of the board of FIG. 8; and,*

*FIG. 14 is a partial top view of an alternate embodiment of the design of my invention in which an end of the board carries a design, the remaining features being identical to those shown in FIGS. 8 to 13.*

Figure 1:
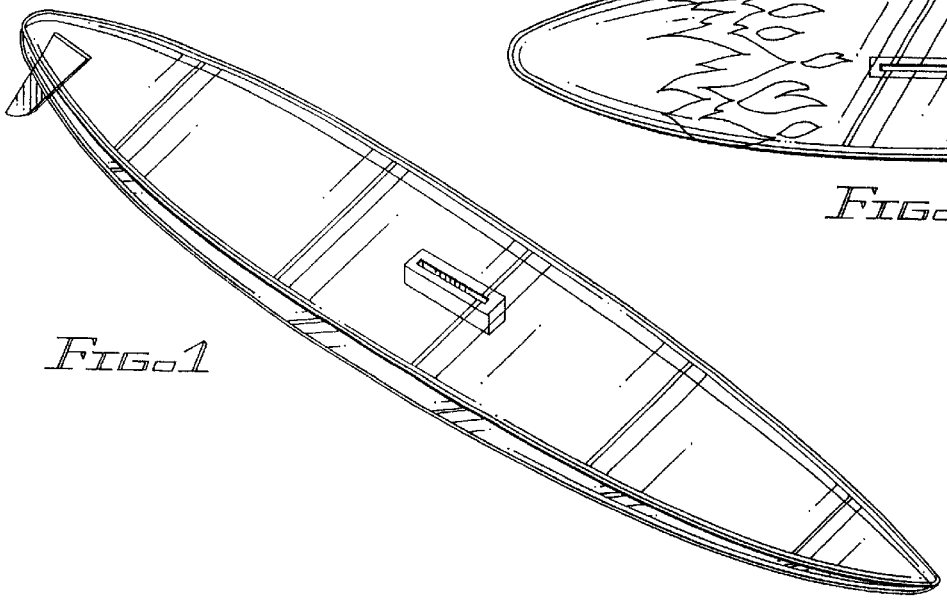
FIG. 1 is a perspective view of a transparent aquatic board showing my new design.
Figure 7:
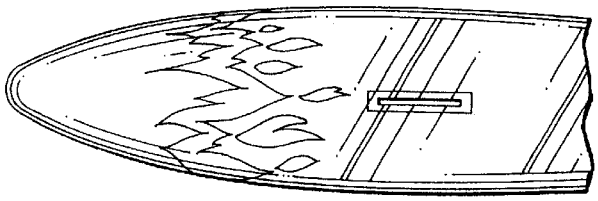
FIG. 7 is a partial top view of an alternate embodiment of the design of my invention in which an end of the board carries an opaque design, the remaining features being identical to those shown in FIGS. 1 to 6.
Figure 2:
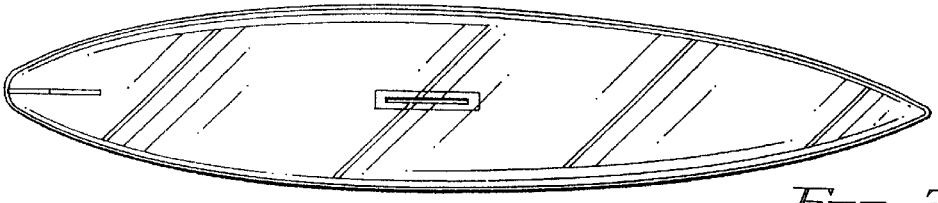
FIG. 2 is a top view thereof.
Figure 3:
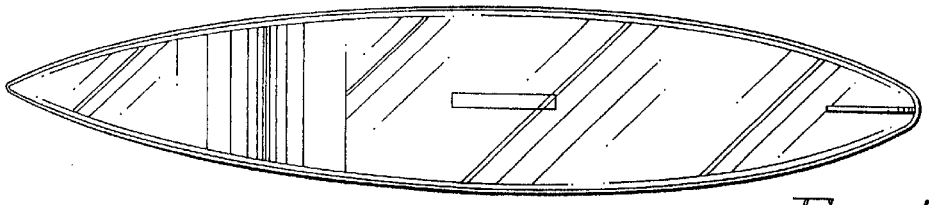
FIG. 3 is a bottom view thereof.
Figure 4:
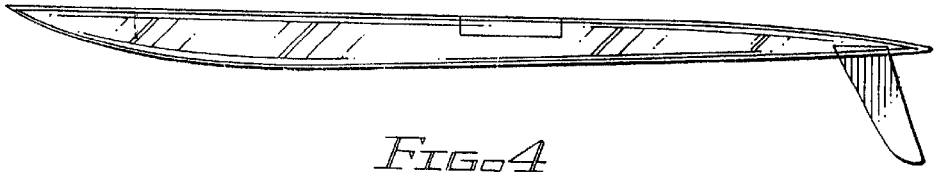
FIG. 4 is a side elevational view of the transparent aquatic board showing my new design.
Figure 5:
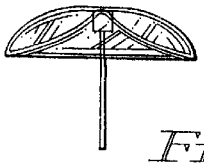
FIG. 5 is a front view thereof.
Figure 6:
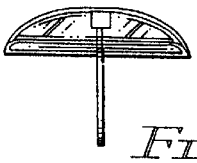
FIG. 6 is a rear view thereof.

*The broken lines shown in FIGS. 8 through 14 of the drawings are for illustrative purposes only and form no part of the claimed design.*

1 Claim, 2 Drawing Sheets

Matter enclosed in heavy brackets [ ] appears in the original patent, but forms no part of this reissue; matter printed in italics indicates the additions made by reissue.

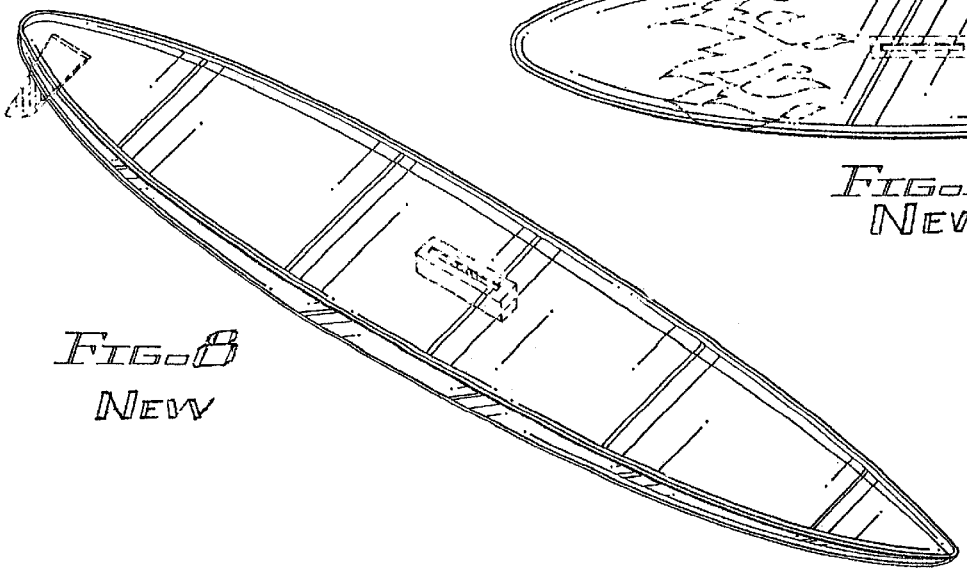
FIG. 8
NEW
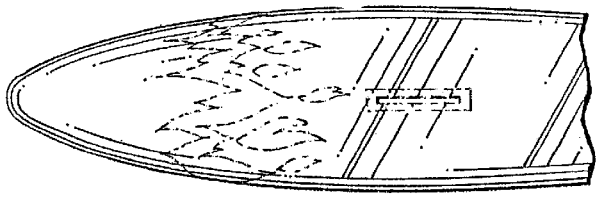
FIG. 14
NEW
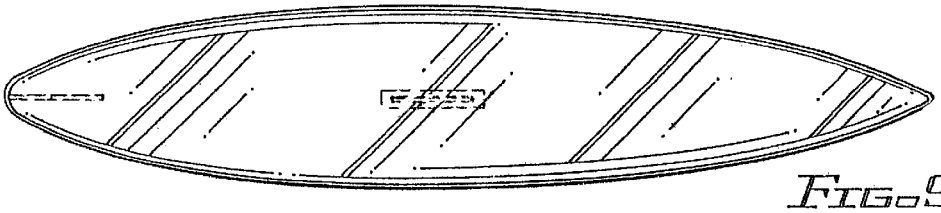
FIG. 9
NEW
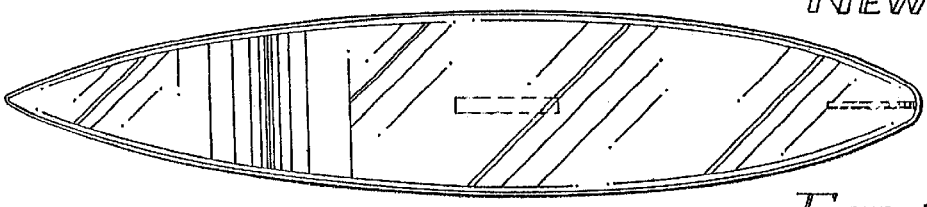
FIG. 10
NEW
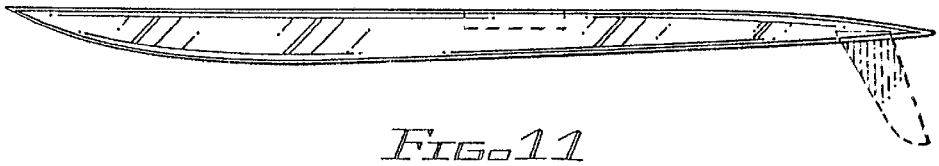
FIG. 11
NEW
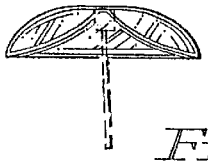
FIG. 12
NEW
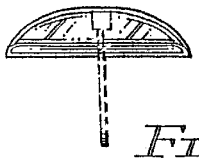
FIG. 13
NEW